United States Patent
Perry

[11] Patent Number: 6,158,759
[45] Date of Patent: Dec. 12, 2000

[54] WAGON STEERING CONTROL MECHANISM

[76] Inventor: Duane L. Perry, 621 W. Main St., Waupun, Wis. 53963

[21] Appl. No.: 09/184,237

[22] Filed: Nov. 2, 1998

[51] Int. Cl.[7] .................................................. B62D 13/00
[52] U.S. Cl. ........................................ 280/444; 280/455.1
[58] Field of Search .................................... 280/442–444, 280/455.1, 400

[56] References Cited

U.S. PATENT DOCUMENTS

| | | | |
|---|---|---|---|
| 2,123,559 | 7/1938 | Bedard | 280/444 |
| 3,294,421 | 12/1966 | Mathissen | 280/455.1 |
| 3,695,628 | 10/1972 | Fisher | 280/444 |
| 4,133,552 | 1/1979 | Sheine | 280/455.1 |
| 4,165,885 | 8/1979 | Good et al. | 280/455.1 |
| 4,306,734 | 12/1981 | Swanson et al. | 280/455.1 |
| 4,579,362 | 4/1986 | Kirkpatrick | 280/444 |
| 4,655,467 | 4/1987 | Kitzmiller et al. | 280/444 |
| 5,340,142 | 8/1994 | Kuhns | 280/444 |

*Primary Examiner*—Brian L. Johnson
*Assistant Examiner*—Matthew Luby
*Attorney, Agent, or Firm*—Donald Cayen

[57] ABSTRACT

A steering control mechanism greatly reduces the sway of a towed trailer. The steering control mechanism comprises a stabilizer that is mounted between the wagon frame and a kingpin that supports a steering wheel. The stabilizer introduces friction that resists changes in the wagon direction of travel that are set up by changes in the direction of travel of a towing vehicle. One end of the stabilizer is connected to the wagon frame. The other end of the stabilizer is joined to a stabilizer block that in turn is attached to the kingpin. The stabilizer produces friction sufficient to resist transient steering forces exerted on the wagon tongue, while allowing the wagon to turn in response to permanent changes in the direction of travel of the towing vehicle.

10 Claims, 7 Drawing Sheets

WAGON STEERING CONTROL MECHANISM

BACKGROUND OF THE INVENTION

1. Field of the Invention

This invention pertains to vehicle safety, and more particularly to apparatus that controls the steering of wagons.

2. Description of the Prior Art

Four-wheel wagons and trailers have been used for many years. They typically include a frame supported by a pair of fixed back wheels and a pair of steering wheels. The steering wheels turn on respective horizontal axles. The steering wheels are connected to a tongue by which the wagon is towed. The tongue is pivotally connected to the wagon frame. Pivoting the tongue rotates the steering wheel axles to steer the wagon. Such wagons are especially popular as farm vehicles, because they are versatile, rugged, and well suited to be towed by a tractor for hauling a variety of cargos.

In some wagons, the steering wheel axles are fixed to each other, and the axles rotate about a single vertical axis in response to pivoting the tongue. In other wagons, the steering wheel axles are independent of each other. The axles are connected to each other by a steering mechanism to rotate in unison about respective vertical axes in response to pivoting the wagon tongue.

Despite their popularity, four-wheel wagons have the undesirable characteristic of being potentially unstable when they are towed. In the past, towing speeds were slow. Changes in the direction of travel of a horse, tractor, truck, or other towing vehicle were easily accommodated by the steering wheels as the changes in direction were transmitted to them by the tongue. In recent years, more powerful tractors and better roads have resulted in considerably higher towing speeds. Under those conditions, the problem of wagon swaying from side to side has become noticeable. If the tractor speed is too great, even small and transient steering changes can set up an unstable situation in which the wagon sways violently from side to side. In some instances, even passing a front wheel over a stone or similar bump can cause swaying problems. That is especially true with modern wagons that employ low-friction kingpins on separate axles for the steering wheels.

A related problem is that along with higher towing speeds, wagons have increased in size. They therefore are capable of carrying heavier loads then in the past. When going down a hill, a heavily loaded wagon tends to push the tractor and create the potential for jackknifing.

Attempts have been made to cure swaying problems of towed vehicles. For example, U.S. Pat. Nos. 3,273,911; 3,294,421; 4,165,885; 4,306,734; and 4,402,523 show stabilizing devices in which fixed assemblies are connected between a semi-trailer and a towing vehicle. U.S. Pat. Nos. 3,400,948 and 3,519,287 teach adjustable friction pads interposed directly between a trailer tongue and a plate on the towing vehicle. None of the mechanisms of the above-mentioned patents is suitable for controlling the steering of four-wheel trailers and wagons.

SUMMARY OF THE INVENTION

In accordance with the present invention, a steering control mechanism is provided that greatly reduces the tendency of a wagon to sway when towed at high speed. This is accomplished by apparatus that includes a stabilizer mounted between the wagon frame and the kingpin of at least one of the wagon steering wheels.

The steering wheel kingpins are mounted in the wagon frame for rotation about vertical axes. The kingpins are connected to the wagon tongue by respective tie rods. Pivoting the tongue causes the tie rods to rotate the kingpins about the vertical axes and thereby steer the wagon.

The stabilizer is comprised of a channel and a flat cantilever plate attached to one end of the channel. The cantilever plate and the middle wall of the channel are parallel, spaced apart, and covered with a friction material. A flat stabilizer bar is slidable between the friction materials. An adjustable clamp draws the cantilever plate and channel wall toward each other to squeeze the stabilizer bar between them. A first socket is joined to the stabilizer channel. A second socket is joined to an end of the stabilizer bar that is exposed outside the channel and cantilever plate.

The first stabilizer socket is connected to a first stabilizer ball on the wagon frame. The second stabilizer socket is joined to a second stabilizer ball that is secured to a stabilizer block. In turn, the stabilizer block is welded or otherwise attached to a kingpin. If desired, the steering control mechanism can be applied to both wagon steering wheels.

Pivoting the wagon tongue to steer the wagon causes the kingpin, and thus the stabilizer block and the second stabilizer ball, to rotate about the kingpin vertical axis. That action causes the stabilizer bar to slide in and out of the channel and cantilever plate in correlation with the amount of rotation of the kingpin. The stabilizer clamp can be adjusted such that it produces no friction on the stabilizer bar when the tongue is pivoted to steer the wagon. In that situation, the tongue pivots in a normal fashion as though the steering control mechanism was not present. To reduce the tendency of the wagon steering wheels to sway during towing, the clamp of the stabilizer is tightened. Then, steering forces that tend to pivot the wagon tongue introduce friction to the stabilizer bar. The friction resists pivoting the tongue and thus resists changing the direction in which the wagon is steered. If the tractor or other towing vehicle makes a rather large and permanent change in direction, the tongue pivots accordingly, and the wagon follows in the new direction. However, any steering forces on the tongue due to small and transient changes in direction of the towing vehicle are eliminated. The wagon therefore tends to travel along a straight path and with a greatly reduced tendency to sway from side-to-side. The amount of friction can be varied to suit different wagon sizes and loads as well as the speed of the towing vehicle.

In a modified embodiment of the invention, the stabilizer block to which the second stabilizer ball is secured is not welded directly to the kingpin. Rather, the stabilizer block is attached to a heavy transfer plate that is fixed to an arm that is part of the kingpin. The stabilizer block and the second stabilizer ball are adjustable relative to the transfer plate to suit the frames of different wagons.

The method and apparatus of the invention, using an adjustable stabilizer between the frame and steering wheels of a wagon, thus controls the steering of the wagon. The probability of the wagon swaying or jackknifing while being towed is remote, even though the wagon is towed at high speed and carrying a heavy load.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
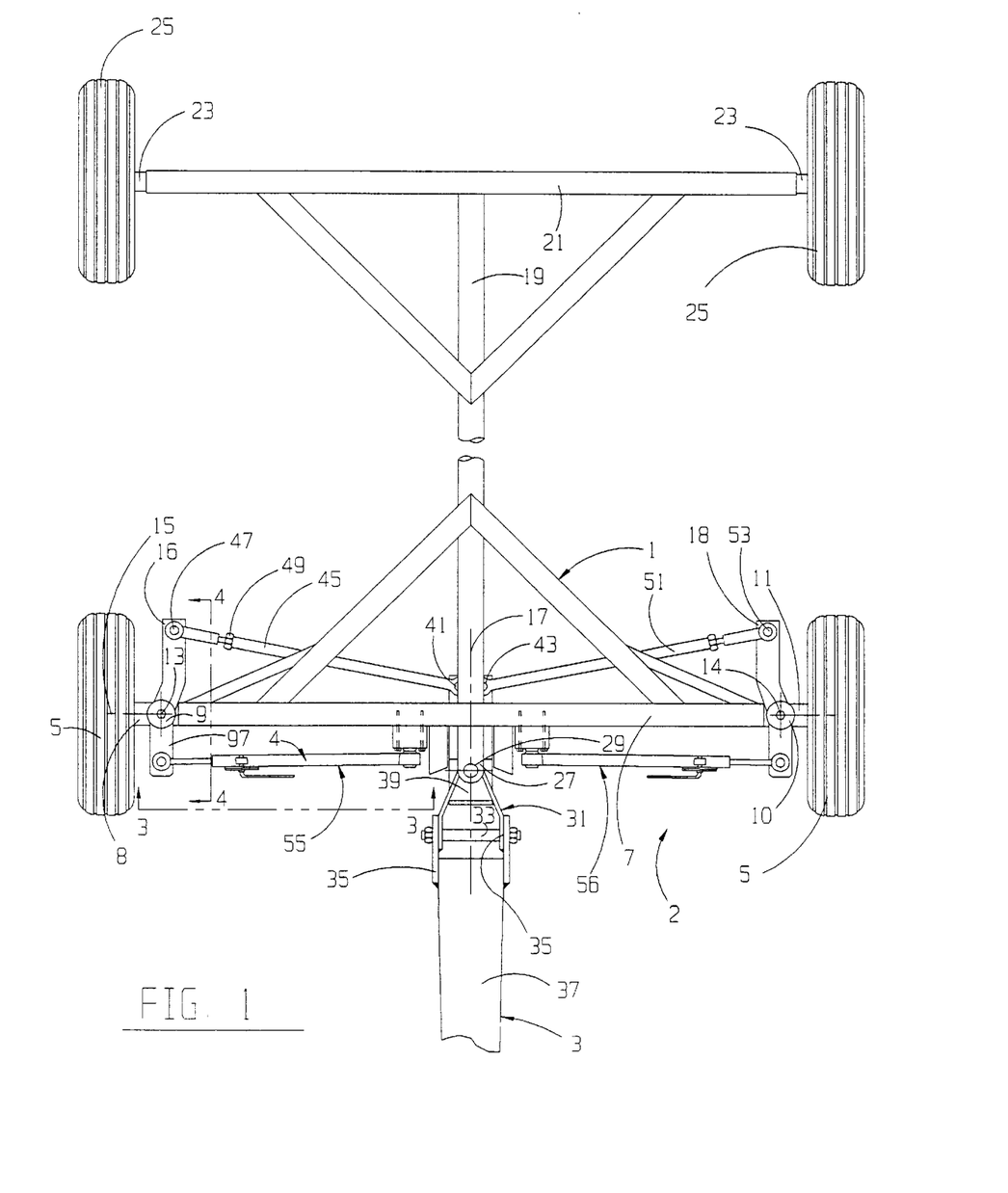
FIG. 1 is a top view of a typical wagon that advantageously includes the present invention, showing the wagon steering wheels for straight-ahead travel.

Referring first to FIG. 1, the frame 1 of a farm wagon 2 is illustrated that includes the steering control mechanism 4 of the present invention. The particular wagon 2 shown is merely representative of a wide variety of towable wheeled vehicles having a tongue 3 and front wheels 5 that steer the vehicle in response to pivoting the tongue. It will be understood that the invention is not limited to use with any particular type of towable vehicle with front steering wheels.

In the illustrated construction, the wagon frame 1 has a front beam 7 that terminates on opposite ends in journals 9, 10. Supported in each journal 9, 10 for rotation about respective vertical axes 13, 14 are first ends of generally L-shaped kingpins 8, 11. The other end of each kingpin 8, 11 is a horizontal axle that supports a wheel 5 for turning about a horizontal axis 15. A horizontal arm 16 is part of the kingpin 8 and extends toward the back of the wagon 2. A similar arm 18 is part of the kingpin 11. A long beam 19 connects the front beam 7 to a back beam 21. Fixed axles 23 on the ends of the back beam 21 support back wheels 25. The frame 1 is symmetrical about a longitudinal centerline 17.

The wagon 2 is both towed and steered by the tongue 3. For that purpose, a pair of vertically spaced plates 27 are welded to the frame front beam 7. A strong pin 29 extends between the plates 27. The pin 29 guides a shackle 31 for pivoting about the pin. A heavy bolt 33 passes between opposed arms 35 of the shackle 31. The bolt 33 supports one end of a long tongue bar 37. The distal end of the tongue bar 37 has a conventional hitch or other means for removably connecting to a tractor or other towing vehicle.

Also welded to the shackle 31 is the front end of a horizontal tongue plate 39. The back end of the tongue plate 39 is provided with a pair of tie rod balls 41, 43. One end of a first tie rod 45 is connected to the ball 41. The second end of the tie rod 45 is connected to a similar tie rod ball 47 that is secured to the tie rod arm 16. The kingpin 45 is adjustable by means of a threaded connection and nut 49. There is a similar tie rod 51 connected between the tie rod ball 43 and a tie rod ball 53 on the kingpin arm 18.

Figure 2:
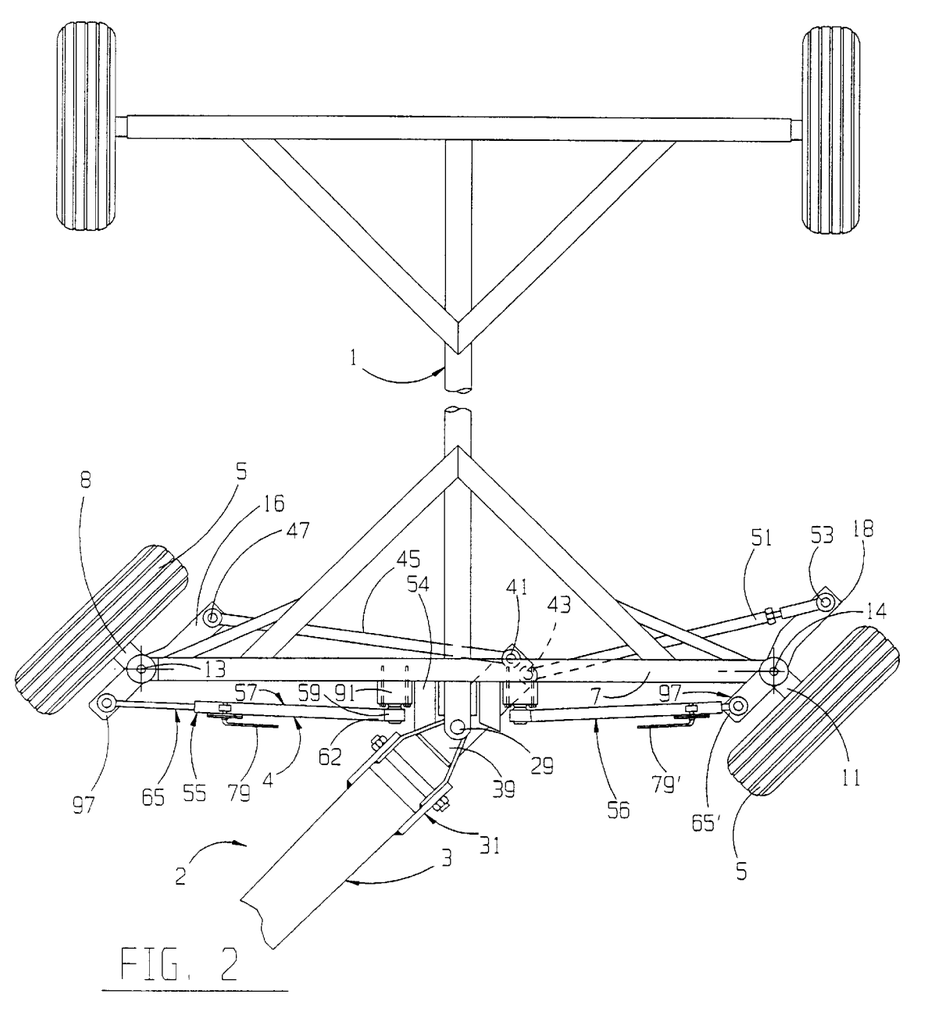
FIG. 2 is a view similar to FIG. 1, but showing the wagon steering wheels turned to the right.

As best shown in FIG. 2, the wagon 2 is steered by pivoting the tongue 3 about the pin 29. Pivoting the tongue causes the shackle plate 39, and thus the tie rod balls 41 and 43, to pivot about the pin 29. The tie rod balls 41 and 43 act through the tie rods 45 and 51, and tie rod balls 47 and 53, to rotate the kingpins 8 and 11 about the axes 13 and 14, respectively. In that manner, the front wheels 5 are controlled to steer the wagon. Pivoting of the tongue and thus rotation of the steering wheels 5 about the axes 13, 14 is limited by a pair of stops 54 fixed to the wagon beam 7. The shackle 31 strikes a stop 54 at the limit of tongue pivoting in both directions about the pin 29.

In accordance with the present invention, undesirable steering movements of the wagon front wheels 5, and thus swaying of the wagon 2 from side-to-side, while being towed is resisted by the steering control mechanism 4. In the preferred embodiment, the steering control mechanism is comprised of two stabilizers 55 and 56 that act between the wagon frame 1 and the kingpins 8 and 11, respectively. Looking also at FIGS. 3 and 5, each stabilizer 55, 56 has a long channel 57 with a middle wall 58 and two side walls 63. A long cantilever plate 61 is spaced from and parallel to the channel middle wall 58. One end 60 of the cantilever plate 61 is welded to the channel walls 58 and 63 at one end 62 of the stabilizer. A friction pad 69 is bonded to each of the channel wall 58 and the cantilever plate 61.

Figure 3:
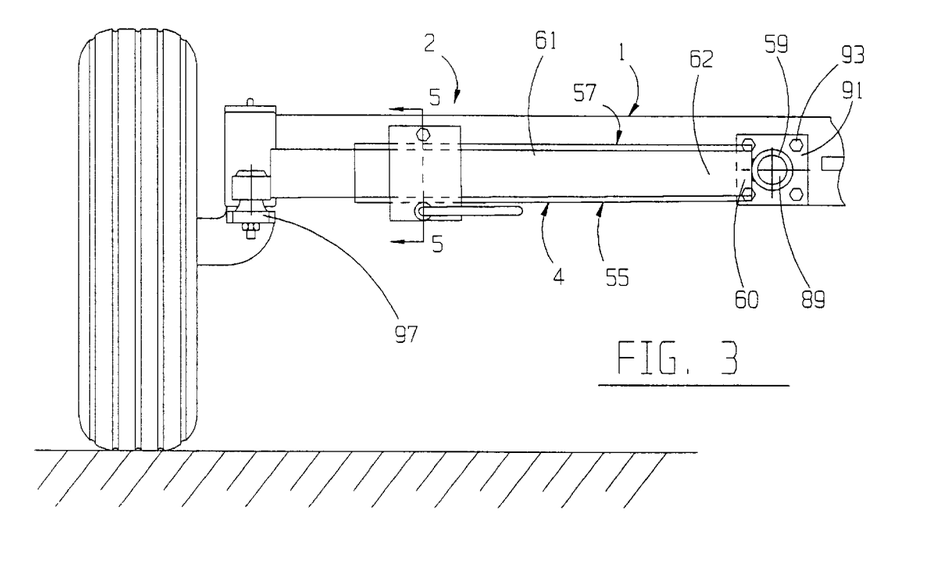
FIG. 3 is a view on an enlarged scale taken along line 3—3 of FIG. 1.
Figure 5:
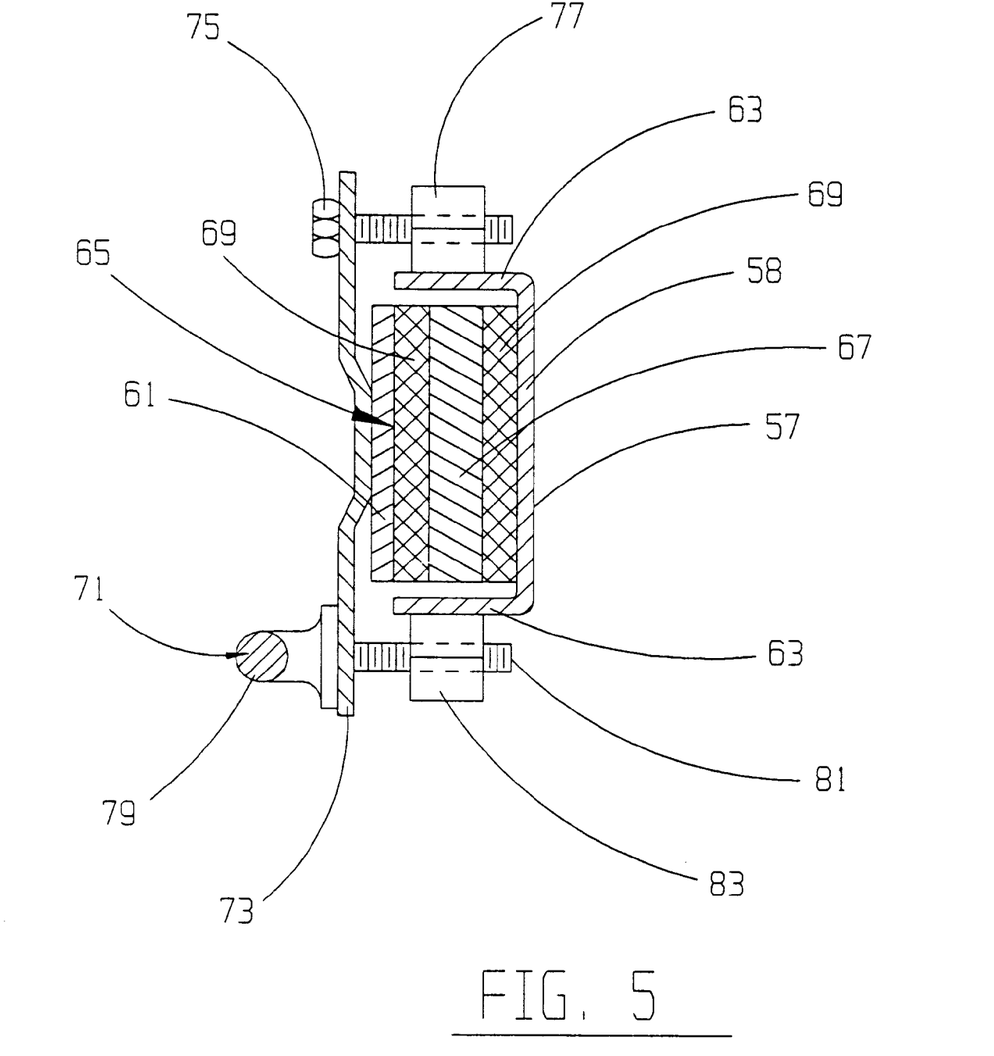
FIG. 5 is a cross sectional view on an enlarged scale taken along line 5—5 of FIG. 3.

Slidable inside the channel 57 and cantilever plate 61 is a stabilizer bar 65. A clamp 71 provides an adjustable squeeze force on the stabilizer bar 65. For that purpose, the clamp 71 has a clamp plate 73 that is captured by a bolt 75 and a handle 79. The bolt 75 passes through the clamp plate 73 and engages a nut 77 welded to one of the channel walls 63. The handle 79 has a threaded end 81 that engages a second nut 83 welded to the other channel wall 63. Turning the handle 79 in one direction creates a lever action on the cantilever plate with the bolt 75 as the fulcrum. The lever action applies a squeeze force to the stabilizer bar between the cantilever plate and the channel middle wall 58. The squeeze force is adjustable by adjusting either or both the bolt 75 and the handle. Accordingly, the amount of force needed to slide the stabilizer bar 65 is adjustable over a wide range.

Also welded to the stabilizer end 62 is a first socket 59. The longitudinal centerline 85 of the socket 59 is perpendicular to the plane of the channel middle wall 58. A bar socket 87 is welded to the exposed end of the stabilizer bar 65. The longitudinal centerline of the bar socket 87 is parallel to the plane of the channel middle wall.

Figure 4:
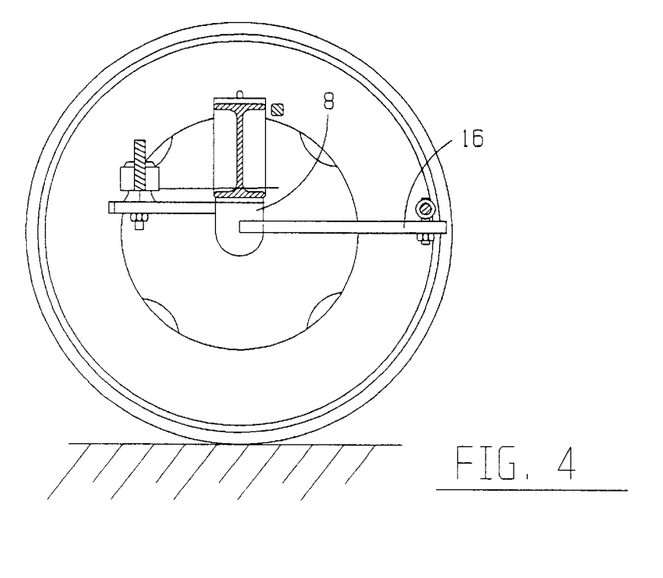
FIG. 4 is a cross sectional view on an enlarged scale taken along line 4—4 of FIG. 1.

The stabilizer socket 59 fits over a stabilizer ball 89 that in turn is mounted to the wagon frame 1. In the particular construction illustrated, the mounting of the stabilizer ball 89 is by means of a stabilizer base 91 that is fastened to the beam 7 with screws 93. However, any suitable components can be used to mount the stabilizer ball 89 to the wagon frame. Although not shown, a conventional hitch pin is used to retain the stabilizer socket 59 on the stabilizer ball 89.

One end of a stabilizer block 97 is welded or otherwise attached to the kingpin 8. A second stabilizer ball 95 is secured to the second end of the stabilizer block 97. The bar socket 87 of the stabilizer bar 65 fits over the second stabilizer ball 95. A hitch pin, not shown, is used to retain the bar socket 87 on the stabilizer ball 95.

With the steering control mechanism 4 in place, pivoting the tongue 3 to steer the wagon 2 results in sliding the stabilizer bars 65 and 65' within the stabilizers 55 and 56, respectively. For example, when the wagon is steered to the right as shown in FIG. 2, the stabilizer bar 65 of the stabilizer 55 is pulled out of the channel 57 and cantilever plate 61 by the rotation of the kingpin 8 and thus of the stabilizer block 97. Simultaneously, the stabilizer bar 65' is pushed into the channel and cantilever plate of the stabilizer 56. The opposite action occurs when the tongue is pivoted to steer the wagon to the left.

To use the steering control mechanism 4, the stabilizer handles 79 and 79' are turned to put the desired amount of squeeze force on the stabilizer bars 65 and 65', respectively. Then, pivoting the tongue 3 to steer the wagon is resisted by the friction forces on the stabilizer bars 65 and 65' by the associated stabilizer channels and cantilever plates. The amount of squeeze force is set low enough such that the wagon tongue 3 does pivot in response to relatively large and permanent changes in direction of the tractor. However, the squeeze force is set sufficiently high such that steering forces exerted on the tongue to pivot it in response to small and transient changes in tractor direction are resisted entirely. The result is that small and transient pivotings of the tongue are eliminated or at least greatly reduced. The wagon 2 therefore does not sway from side-to-side, but instead tracks in a much straighter line than without the steering control mechanism 4, thereby significantly improving the safety aspects of towing even a heavily loaded wagon at a relatively high speed.

Turning to FIGS. 6–9, a modified steering control mechanism 98 is shown in conjunction with the wagon 2. The steering control mechanism 98 is comprised of two stabilizers 55', 56' and associated bases 91'. Sockets 59' on the stabilizers 55' and 56' fit over stabilizer balls 89' that are mounted to the bases 91'.

Bar sockets 87' of the stabilizer bars fit over respective second stabilizer balls 95'. In the steering control mechanism 98, the second stabilizer balls 95' are adjustable relative to the kingpins 8 and 11. Further, the second stabilizer balls 95' are mounted to the wagon 2 without the necessity of welding on the kingpins. Instead, each second stabilizer ball 95' is secured to one end 100 of a stabilizer block 104. The second end 106 of the stabilizer block 104 is attached to a transfer plate 99.

Figure 8:
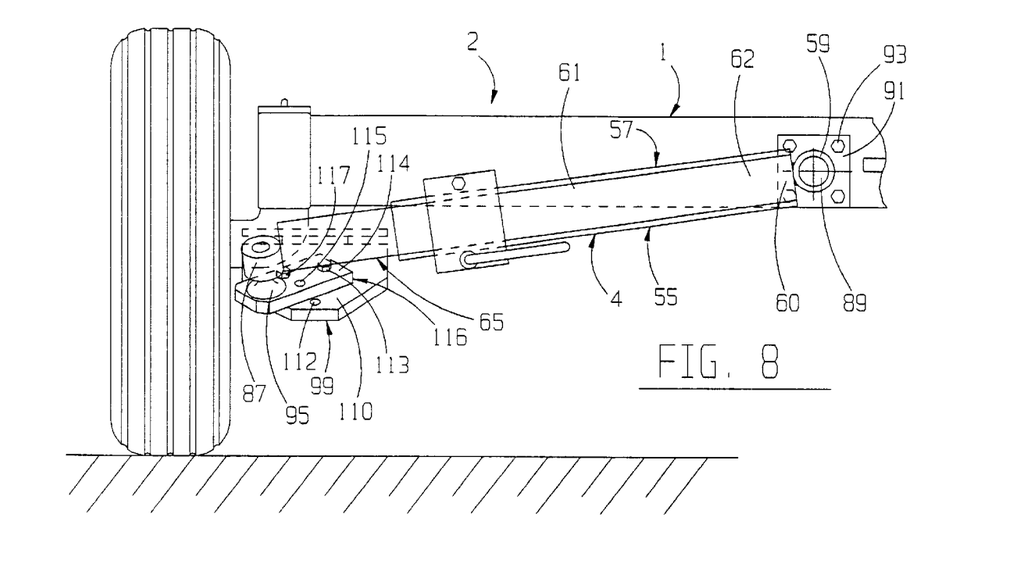
FIG. 8 is a cross sectional view on an enlarged scale taken along line 8—8 of FIG. 6.
Figure 9:
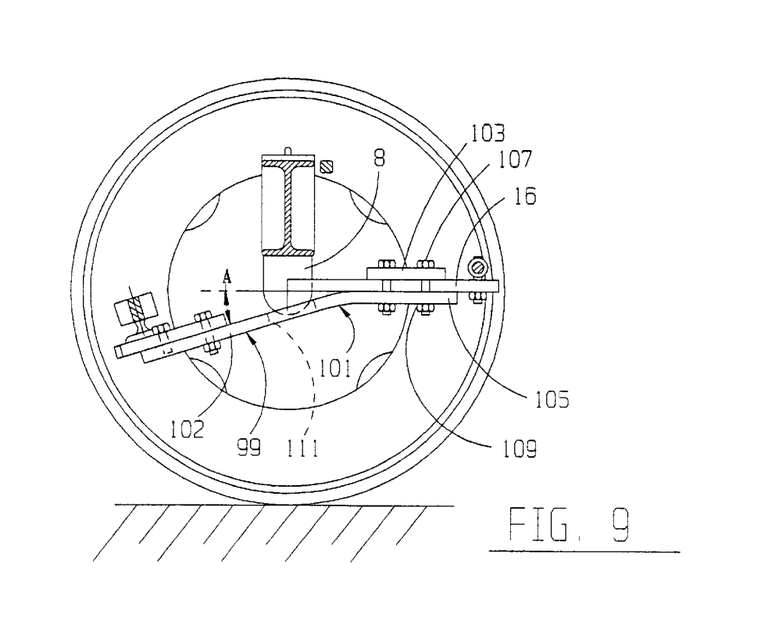
FIG. 9 is a cross sectional view on an enlarged scale taken along line 9—9 of FIG. 6.

The transfer plate 99 has a main plate 101 and an auxiliary plate 103. The main plate 101 has a first section 105 that abuts the underside of the arm 16 of the kingpin 8. The auxiliary plate 103 lies on top of the kingpin arm. Bolts 107 straddle the kingpin arm and pass through the auxiliary plate and the transfer plate section 105 to engage nuts 109. In that manner, the kingpin arm is rigidly sandwiched between the plates 101 and 103.

In the illustrated construction, the main plate 101 of the transfer plate 99 is not flat. Rather, the main plate has a second section 102 that makes an angle A with the first section 105. The particular angle A may vary to suit different wagons. For the particular wagon 2 shown, an angle A of approximately 30 degrees is satisfactory. There is a cutout 111 in the second section 102 that provides ample clearance with the kingpin 8. There are a number of holes 112 through the second section 102 at the end 110 thereof opposite the first section 105.

The end 106 of the stabilizer block 104 is attached to the transfer plate end 110 by a bolt and nut 113. The stabilizer ball 95' is secured to the stabilizer block end 100 opposite the bolt 113. There is at least one and preferably two holes 115 through the stabilizer block 104. Swiveling the stabilizer block about the bolt 113 aligns one of the holes 115 with different ones of the holes 112 in the transfer plate 99. In that manner, the location of the stabilizer ball 95' can be adjusted relative to the transfer plate.

Figure 6:
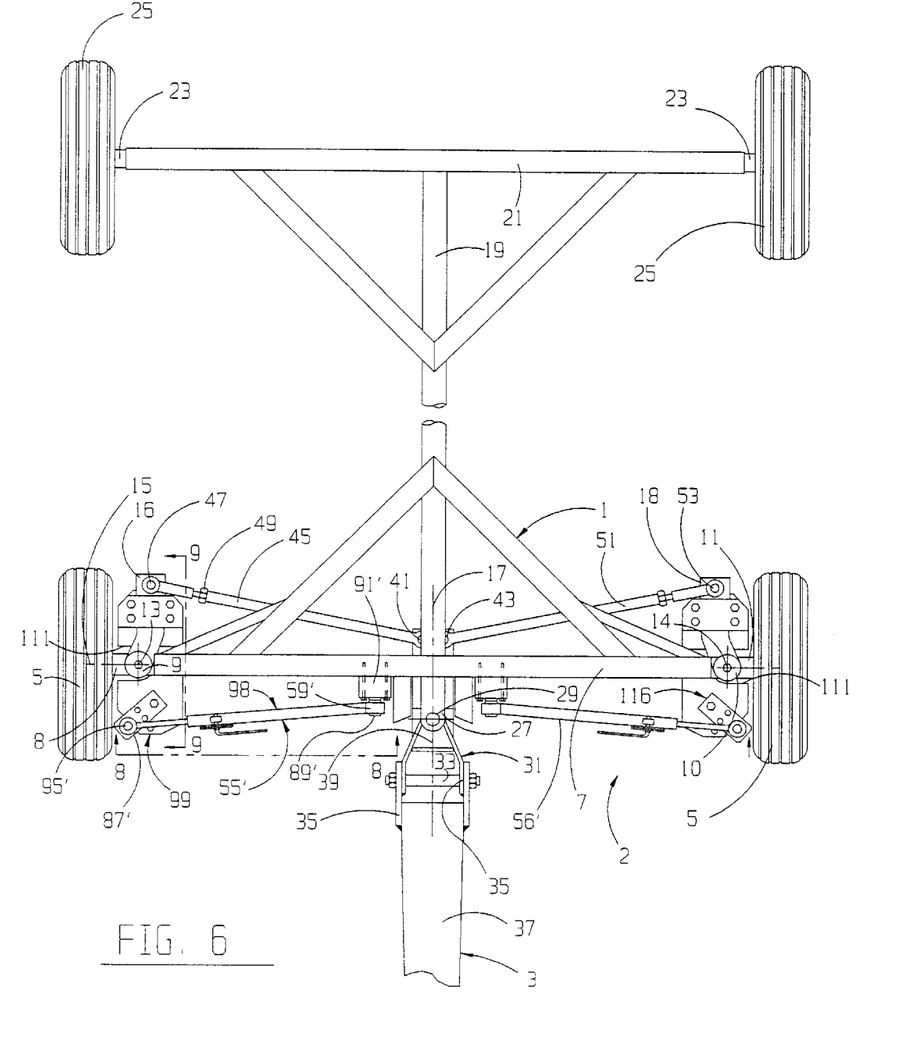
FIG. 6 is a view generally similar to FIG. 1, but showing a modified embodiment of the invention.
Figure 7:
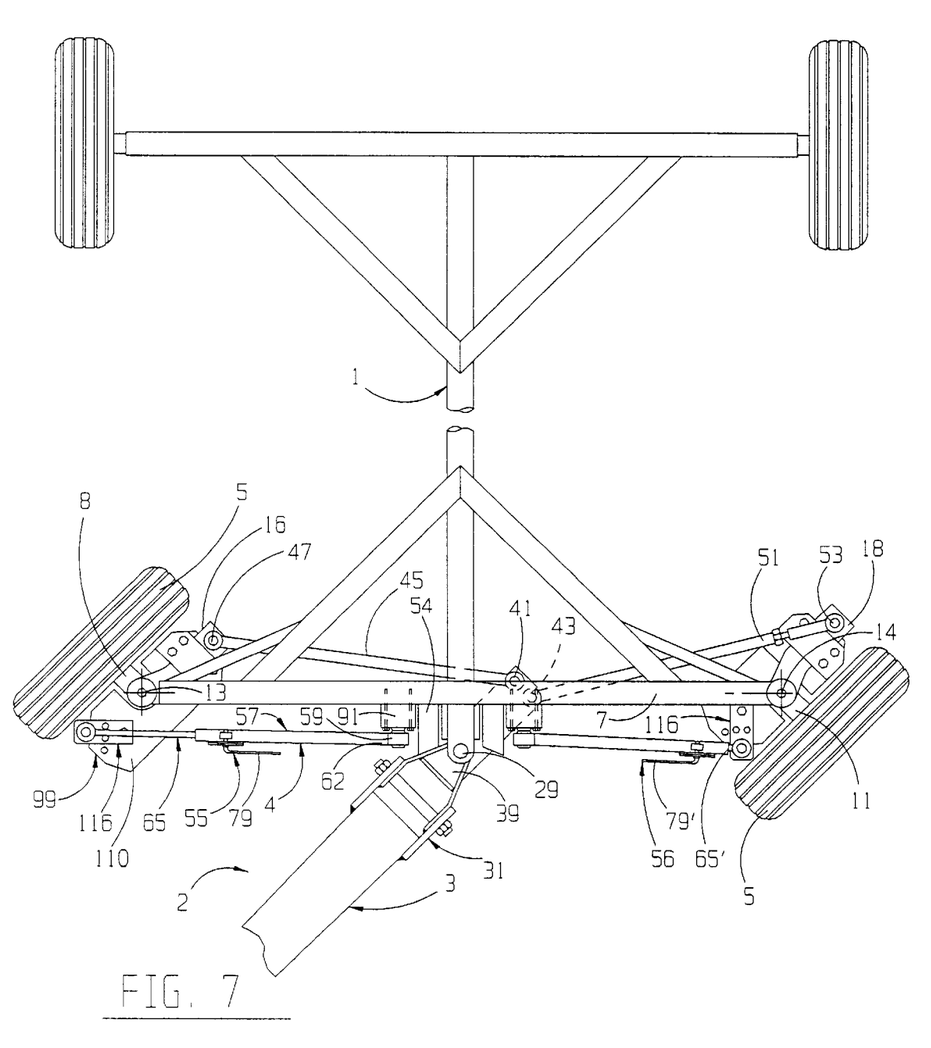
FIG. 7 is a view generally similar to FIG. 2, but showing the modified embodiment of FIG. 6.

As mentioned, the bar socket 87' at the end of the stabilizer bar 65 fits over the stabilizer ball 95'. By swiveling the stabilizer block 104 about the bolt 113, the stabilizer ball 95' can be located to suit the stabilizer 55' to the particular wagon 2 such that the stabilizer does not interfere with the wagon frame 1 when the wagon is steered. A bolt and nut 117 passing through the correctly aligned holes 112 and 115 rigidly attach the stabilizer block and stabilizer ball 95' to the transfer plate 99.

In summary, the results and advantages of towed four-wheel vehicles can now be more fully realized. The steering control mechanism provides both increased safety when towing loaded wagons and the like, and the ability to adjust the wagon steering qualities to suit the particular operating conditions. This desirable result comes from using the combined functions of the stabilizers and the stabilizer blocks. The stabilizer blocks rotate about the vertical axes 13 and 14 in unison with the kingpins 8 and 11 and thus produce motion relative to the wagon frame 2 when the tongue 3 is pivoted to steer the wagon. Interposing the stabilizers between the rotatable stabilizer blocks and the stationary wagon frame 1 causes relative motion between the stabilizer bars 65 and 65', which are connected to the stabilizer blocks, and the stabilizer channels 57 and cantilever plates 61, which are connected to the wagon frame. Friction produced on the stabilizer bars by the channel and cantilever plates when steering forces are exerted on the tongue creates a resistance to the tongue pivoting. Transient steering variations potentially set up in the tongue as it is towed are therefore reduced to enhance the safety of the wagon. According to one aspect of the invention, transfer plates are fixed to the kingpins in a manner that requires no modification to the kingpins. The stabilizer blocks are adjustably attached to the transfer plates to suit the stabilizers to different wagon frames.

It will also be recognized that in addition to the superior performance of the steering control mechanism, its construction is such to be of modest cost in relation to the benefits it provides. Also, since the invention is made of rugged components and is of a simple design, it will give a long service life with but minimal maintenance.

Thus, it is apparent that there has been provided, in accordance with the invention, a steering control mechanism that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for steering a wagon comprising:
   a. a pair of steering wheels turnable on respective kingpins that are rotatable in a wagon frame;
   b. a tongue pivotable on the wagon frame in response to a steering force exerted on the tongue;
   c. tie rod means for rotating the kingpins to steer the wagon steering wheels in response to pivoting the tongue, wherein the tie rod means comprises an arm on each kingpin that rotates therewith; and
   d. control means for providing a selected resistance to pivoting the tongue, the control means comprising means for introducing friction between the wagon frame and at least one kingpin arm in response to the steering force exerted on the tongue, wherein the means for introducing friction comprises:
      i. a transfer plate fixed to said at least one kingpin arm for rotation therewith; and ii. stabilizer means for producing friction between the wagon frame and the transfer plate in response to the steering force exerted on the tongue.

2. The apparatus of claim 1 wherein the transfer plate comprises a main plate and an auxiliary plate that cooperate to sandwich said at least one kingpin arm therebetween and thereby fix the transfer plate to said at least one kingpin.

3. The apparatus of claim 1 wherein the stabilizer means comprises:
   a. a stabilizer block attached to the transfer plate; and
   b. a stabilizer comprising:
      i. a channel connected to the wagon frame;
      ii. a stabilizer bar joined to the stabilizer block, the stabilizer bar sliding in the channel in response to pivoting the tongue; and
      iii. means for producing an adjustable squeeze force between the stabilizer bar and the channel.

4. The apparatus of claim 3 wherein the stabilizer block is adjustably attached to the transfer plate to enable the stabilizer to avoid interference with the wagon frame when said at least one kingpin and transfer plate rotate.

5. The apparatus of claim 1 wherein the transfer plate comprises:
   a. a main plate having first and second sections, the first section being in abutting contact with a first side of said at least one kingpin arm;
   b. an auxiliary plate in abutting contact with a second side of said at least one kingpin arm; and
   c. fastener means for cooperating with the main plate and the auxiliary plate to fix the transfer plate to said at least one kingpin arm.

6. The apparatus of claim 5 wherein the transfer plate first section makes a predetermined angle with the second section.

7. The apparatus of claim 5 wherein the transfer plate first section is formed with a cutout that provides clearance between the transfer plate and said at least one kingpin.

8. The apparatus of claim 3 wherein:
   a. the stabilizer means further comprises a stabilizer base immovably fastened to the wagon frame, and a frame stabilizer ball secured to the stabilizer base; and
   b. the stabilizer channel comprises a channel socket that fits over the frame stabilizer ball to thereby connect the stabilizer to the wagon frame.

9. The apparatus of claim 3 wherein:
   a. a plate stabilizer ball is secured to the stabilizer block; and
   b. the stabilizer further comprises a bar socket on the stabilizer bar that fits over the plate stabilizer ball to thereby join the stabilizer bar to the stabilizer block.

10. A method of steering a wagon having a frame, a tongue, steering wheels that steer the wagon in response to pivoting the tongue comprising the steps of:
    a. connecting the tongue to a vehicle;
    b. towing the wagon with the vehicle;
    c. changing the direction of travel of the vehicle and thereby exerting steering forces on the wagon tongue;
    d. introducing friction between the wagon frame and the steering wheels in response to exerting the steering forces on the tongue and thereby resisting steering chances of the wagon produced by transient changes of direction by the vehicle, wherein the step of introducing friction comprises the steps of:
       i. mounting a stabilizer between the wagon frame and the steering wheels comprising the steps of:
          fixing a transfer plate to the wagon kingpin;
          attaching a stabilizer block to the transfer plate; and
          mounting the stabilizer between the stabilizer block and the wagon frame; and
       ii. producing friction in the stabilizer in response to exerting the steering forces on the tongue by the vehicle; and
    e. adjusting the stabilizer block on the transfer plate to avoid interference between the stabilizer and the wagon frame when the tongue pivots to steer the wagon.

* * * * *